US006639388B2

(12) United States Patent
Tihanyi

(10) Patent No.: US 6,639,388 B2
(45) Date of Patent: Oct. 28, 2003

(54) FREE WHEELING BUCK REGULATOR WITH FLOATING BODY ZONE SWITCH

(75) Inventor: Jenoe Tihanyi, Kirchheim (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 10/272,343

(22) Filed: Oct. 15, 2002

(65) Prior Publication Data

US 2003/0067286 A1 Apr. 10, 2003

Related U.S. Application Data

(63) Continuation of application No. PCT/EP01/04123, filed on Apr. 10, 2001.

(30) Foreign Application Priority Data

Apr. 13, 2000 (DE) .................. PCT/DE00/01154

(51) Int. Cl.[7] ............................................. G05F 1/613
(52) U.S. Cl. ........................................ 323/224; 323/289
(58) Field of Search ................................ 323/224, 282, 323/287, 289, 225, 231, 229, 290; 327/566, 581, 434; 361/91.6, 91.7

(56) References Cited

U.S. PATENT DOCUMENTS

| 3,636,378 A | * | 1/1972 | Chashi et al. ............ 327/384 |
| 4,942,312 A | * | 7/1990 | Stevens .................. 327/543 |
| 4,994,886 A | | 2/1991 | Nadd |
| 5,172,290 A | * | 12/1992 | Leipold et al. ............ 361/56 |
| 5,410,467 A | | 4/1995 | Smith et al. |
| 5,929,615 A | | 7/1999 | D'Angelo et al. |
| 5,994,882 A | | 11/1999 | Ma |

FOREIGN PATENT DOCUMENTS

| EP | 0 072 690 A2 | 2/1983 |
| EP | 0 655 837 A2 | 5/1995 |
| JP | 06339271 A | 12/1994 |
| JP | 07 079 564 | 3/1995 |
| JP | 07170746 A | 7/1995 |
| JP | 07 194 105 | 7/1995 |
| JP | 10/146 047 | 5/1998 |
| JP | 10174431 A | 6/1998 |
| JP | 2000011673 A | 1/2000 |

OTHER PUBLICATIONS

Tietze/Schenk: "Halbleiter–Schaltungstechnik" [semiconductor circuit technology], *Springer–Verlag, Berlin, 9th ed.*, 1991, pp. 564–565 no month.
B. Murari et al. (ed.): "Smart Power ICs", *Springer–Verlag, Berlin, 1995*, pp. 287 no month.

* cited by examiner

*Primary Examiner*—Shawn Riley
(74) *Attorney, Agent, or Firm*—Laurence A. Greenberg; Werner H. Stemer; Ralph E. Locher

(57) ABSTRACT

A voltage transformer includes a pair of input terminals for applying an input voltage, a series circuit connected in parallel to the pair of input terminals of a first switch, and a low pass filter. The low pass filter has output terminals for connecting a load. A freewheeling circuit is connected in parallel to the low pass filter. The freewheeling circuit has a second switch, which is configured as a MOS transistor, with a gate terminal and a load path formed between a first load path terminal and a second load path terminal. The MOS transistor has a body zone mounted in a floated manner or connected to a source zone by an ohmic resistor.

15 Claims, 3 Drawing Sheets

FREE WHEELING BUCK REGULATOR WITH FLOATING BODY ZONE SWITCH

CROSS-REFERENCE TO RELATED APPLICATION

This application is a continuation of copending International Application No. PCT/EP01/04123, filed Apr. 10, 2001, which designated the United States and was not published in English.

BACKGROUND OF THE INVENTION

Field of the Invention

The present invention relates to a voltage converter (buck converter).

Such a voltage converter is disclosed, for example, in B. Murari, F. Bertotti, G. A. Vignola: "Smart Power ICs—Technologies and Applications", Springer Verlag, Berlin, 1996, page 287, or in U. Tietze, Ch. Schenk: "Halbleiter-schaltungstechnik" [Semiconductor Circuitry], 9th Edition, Springer Verlag, Berlin, 1991, page 564. The construction and the method of operation of such a voltage converter according to the prior art are explained below with reference to FIG. 1.

The task of a voltage converter is to convert a DC voltage V1 into a lower DC voltage V2 for supplying a load $R_L$. To that end, in the prior art voltage converter, a series circuit including a switch S, a coil L, and a capacitor C is connected in parallel with the DC voltage source V1, the load being connected in parallel with the capacitor C. A diode DI is connected in parallel with the series circuit including the coil and the capacitance C. If the switch S is closed, a current flows from the voltage source V1 through the coil L to the capacitance C and through the load $R_L$ and the current through the capacitance rises continuously. The DC voltage V1 is present across the diode, the diode DI being in the off state with the switch S closed. If the switch S is subsequently opened, the voltage present across the coil L reverses, the current through the coil L maintaining its direction and beginning to decrease. The reversal of the voltage across the coil has the effect that the potential at the node that is common to the switch and the coil decreases. The diode DI is, thereby, turned on and accepts the current flowing from the coil L to the capacitor C and through the load $R_L$. The series circuit including the coil L and the capacitor C acts as a low-pass filter and converts the voltage V1, which is applied to the series circuit in a clocked manner by the switch S, into a continuous output voltage V2, which is lower than the input voltage V1. The value of the output voltage V2 is adjustable by way of the frequency with which the switch is switched on and off and by way of the time duration for which the switch S is respectively open and closed.

What is problematic, in particular, in the case of very high switching frequencies, is that after the opening of the switch S, when the diode DI is in the on state, charge is stored in the pn junction of the diode DI. This stored charge has the effect that even after the closing of the switch S, when the diode DI is supposed to be in the off state, the diode DI is still briefly in the on state until the stored charge has flowed away. The storage leads to switching losses that increase as the switching frequency rises. Moreover, with the diode DI in the on state, the losses brought about at the diode DI are undesirable.

To reduce these losses, the prior art uses, instead of the diode, a field-effect transistor, in particular, a MOSFET (Metal Oxide Semiconductor Field-Effect Transistor), which, in a manner driven by a drive circuit, is intended to be in the on state whenever the switch is in the off state. The MOSFETs used for such a purpose have an integrated freewheeling diode that is connected in parallel with the drain-source path of the MOSFET and whose connections correspond to the connections of the diode DI according to FIG. 1. This freewheeling diode is formed by virtue of the fact that, in conventional MOSFETs, the source zone and the body zone are short-circuited to obtain a high dielectric strength of the FET. Such FETs are in the off state only with application of a forward voltage in the drain-source direction (forward direction), if no drive voltage is present between gate and source, the forward voltage being a positive voltage in the case of n-channel FETs and a negative voltage in the case of p-channel FETs in the drain-source direction. The dielectric strength may have a value of up to a few hundred volts in the case of power FETs. With application of a voltage in the reverse direction, i.e., with application of a negative drain-source voltage in the case of n-channel FETs and a positive drain-source voltage in the case of p-channel FETs, the conventional FETs are already in the on state when the threshold voltage of the freewheeling diode is reached. Such an effect is desired when conventional FETs are used as a replacement for the diode in voltage converters.

To avoid shunt currents, that is to say, currents that flow away through the switch and directly through the FET, the switch and the FET are not permitted to be in the on state simultaneously. Shortly after the opening of the switch, when the FET is supposed to be in the on state but is not yet fully in the on state, the integrated freewheeling diode of the FET accepts the current from the coil until the FET is fully in the on state. The losses incurred at the FET that is fully in the on state are lower than when using a diode in accordance with FIG. 1 as freewheeling element.

However, in the case of such voltage converters, too, a charge is stored in the freewheeling diode of the FET, the charge having the effect that even after the FET has turned off, the freewheeling diode is still briefly in the on state until the stored charge has flowed away. The affect leads to switching losses that may be considerable, in particular, at high switching frequencies.

SUMMARY OF THE INVENTION

It is accordingly an object of the invention to provide a voltage converter that overcomes the hereinafore-mentioned disadvantages of the heretofore-known devices of this general type and that reduces the switching losses compared with conventional voltage converters.

With the foregoing and other objects in view, there is provided, in accordance with the invention, a voltage converter, including a pair of input terminals for receiving an input voltage, a series circuit connected in parallel with the pair of input terminals and having a first switch and a low-pass filter having output terminals to be connected to a load, a freewheeling circuit connected in parallel with the low-pass filter, the freewheeling circuit having a second switch, the second switch having a first load path terminal, a second load path terminal, a load path formed between the second load path terminal and the first load path terminal, and a control terminal, and the second switch being a MOS transistor having one of a floating body zone and a source zone, a non-reactive resistor, and a body zone connected to the source zone through the non-reactive resistor.

According to the invention, the freewheeling circuit has a second voltage-controlled switch having a control terminal and a load path formed between a first and second load path terminal, the second switch being configured as a MOSFET whose body zone is formed in a floating fashion, that is to say, is not connected to a defined potential, or is connected to the source zone through a non-reactive resistor. The gate terminal of such a MOSFET forms the control terminal of the second switch, the source and drain terminals form the first and second load path terminals, and the drain-source path of the MOSFET forms the load path of the second switch.

In the case of the MOS transistor used as freewheeling element in the voltage converter according to the invention, the floating configuration of the body zone means that there is no short circuit present between the body zone and the source zone. Consequently, the MOS transistor forming the second switch is in the off state not only with application of a voltage in the forward direction, that is to say, in the case of a positive drain-source voltage in the case of an n-conducting MOSFET and a negative drain-source voltage in the case of a p-conducting MOSFET, but also with application of a voltage in the reverse direction, that is to say, in the case of a negative drain-source voltage in the case of an n-conducting MOSFET and a positive drain-source voltage in the case of a p-conducting MOSFET, if no gate-source voltage is present in each case. Such transistors are also referred to as reverse-blocking FETs (RB-FETs). The blocking voltage of such MOSFETs in the reverse direction (source-drain direction) is usually smaller than the blocking voltage in the forward direction (drain-source direction). The blocking voltage in the source-drain direction lies at least in the region of a few volts and is higher than the threshold voltage of an integrated freewheeling diode in conventional MOSFETs.

When such a MOSFET is used as a second switch, after the opening of the first switch, when the MOSFET is turned on, charge that might lead to switching losses when the MOSFET is subsequently turned off is not stored in the MOSFET.

In accordance with another feature of the invention, there is provided, in the case of a reverse-blocking FET used as a second switch and having a body zone disposed in a floating fashion, for connecting a rectifier element between its first load path terminal, that is to say, the source terminal, and its control terminal, that is to say, the gate terminal. If the first switch is opened in the voltage converter according to the invention, then the voltage present across the load path of the reverse-blocking FET changes its sign and the reverse-blocking FET is turned on in a manner driven by the rectifier element. Because, in the reverse-blocking FET, no freewheeling diode with pn junction is connected directly between the first and second load path terminals, charge storage effects, which might lead to switching losses when the second switch configured as a MOSFET is subsequently turned off, do not occur. The freewheeling diode can be dispensed with in such an embodiment because the reverse-blocking MOSFET used as a second switch is immediately turned on in a manner driven by the rectifier element after the opening of the first switch.

In accordance with a further feature of the invention, a Schottky diode is connected in parallel with the load path of the second switch. If the first switch is opened in a such a voltage converter, then the voltage present across the load path of the second switch changes its sign and the Schottky diode connected in parallel with the load path of the second switch is turned on and accepts the current of an inductance present in the low-pass filter. If the second switch is subsequently turned on in a manner driven by a drive circuit, then the second switch accepts the current, the Schottky diode immediately turning off when the voltage across the load path of the second switch falls below the value of the threshold voltage of the Schottky diode. No charge that may lead to switching losses after the second switch is turned off is stored in the Schottky diode.

In accordance with an added feature of the invention, there is provided a drive circuit that is connected to the control terminal of the second switch to drive the second switch. With the use of a reverse-blocking FET with a rectifier element between the source terminal and the gate terminal, the drive circuit serves for discharging the gate capacitance present in the FET—which gate capacitance is charged through the rectifier element to turn the MOSFET on—through the drive circuit in order, thereby, to turn the MOSFET off.

In accordance with an additional feature of the invention, the low-pass filter has a series circuit with a coil and a capacitor, and the capacitor is connected in parallel with the output terminals.

With the use of a reverse-blocking FET with a Schottky diode connected in parallel and without a rectifier element between source and gate, the drive circuit serves both for driving the FET to turn it on and for driving the FET to turn it off.

In an advantageous manner, the first switch is a transistor, or is configured as a field-effect transistor, in particular, a MOSFET, which is driven by a drive circuit. Provision is expediently made of a drive circuit having two outputs for driving the first and second switches, the drive circuit being configured so as to ensure that only one of the two switches respectively is in the on state. Shunt currents, that is to say, currents that flow back to the voltage source directly through the first and second switches with short-circuiting of the low-pass filter and the load, are, thereby, avoided.

In accordance with yet another feature of the invention, there is provided a drive circuit having an output terminal connected to the first switch for driving the first switch.

In accordance with yet a further feature of the invention, the driving of the first and/or second switch is effected in a manner dependent on an output voltage that can be tapped off at the output terminals. The output voltage can, thus, be readjusted in the event of changes in the load connected to the output terminals. Instead of the output voltage, a signal dependent on a current through the coil of the low-pass configuration can also be fed to the drive circuit.

In accordance with yet an added feature of the invention, there is provided a drive circuit connected to the control terminal of the second switch and driving the second switch dependent upon a switching state of the first switch.

In accordance with yet an additional feature of the invention, there is provided a drive circuit for both of the first and second switches, preferably, connected to the first switch and the second switch.

In accordance with again another feature of the invention, the drive circuit prevents the first switch and the second switch from both being in an on state simultaneously.

In accordance with a concomitant feature of the invention, the second switch is a MOSFET having a body zone and a recombination zone formed in the body zone.

Other features that are considered as characteristic for the invention are set forth in the appended claims.

Although the invention is illustrated and described herein as embodied in a voltage converter, it is, nevertheless, not intended to be limited to the details shown because various

DESCRIPTION OF THE PREFERRED EMBODIMENTS

In the figures of the drawings, unless stated otherwise, identical reference symbols denote identical parts.

Figure 1:
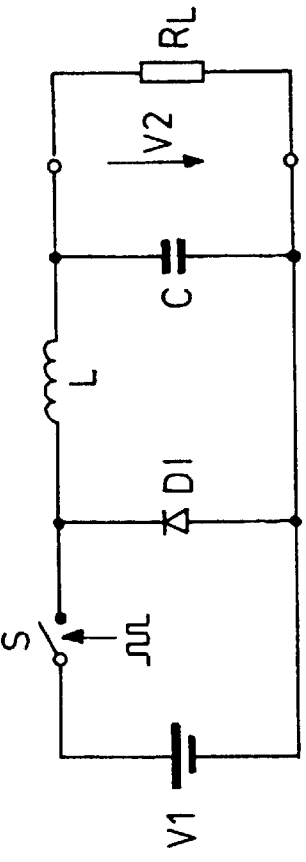
FIG. 1 is a schematic circuit diagram of a prior art voltage converter.
Figure 2:
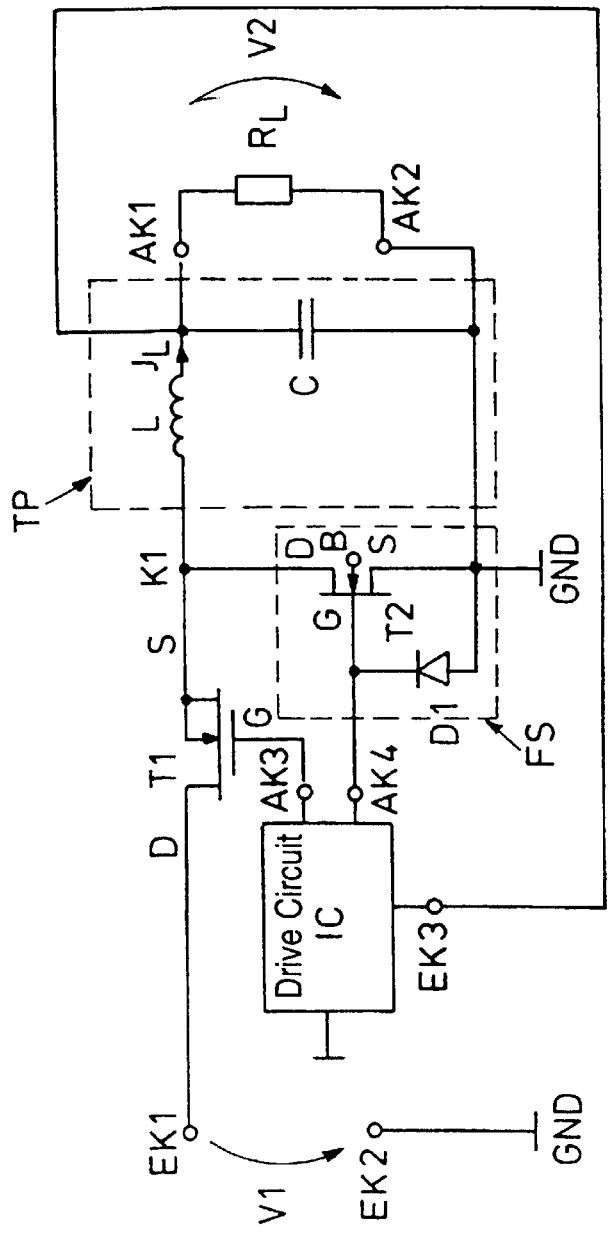
FIG. 2 is a schematic circuit diagram of a voltage converter according to the invention.

Referring now to the figures of the drawings in detail and first, particularly to FIG. 2 thereof, there is shown a voltage converter having an input terminal pair EK1, EK2 for application of an input voltage V1, one of the two input terminals being connected to a reference-ground potential GND, usually ground, in the exemplary embodiment. A series circuit including a first switch T1 and a low-pass filter TP is connected in parallel with the input terminals EK1, EK2, the low-pass filter TP having an output terminal pair AK1, AK2 for providing an output voltage V2 for a load $R_L$. In the exemplary embodiment, the first switch T1 is a MOSFET whose drain-source path D-S is connected between the first input terminal EK1 and the low-pass filter TP and whose gate electrode G is connected to an output terminal AK3 of a drive circuit IC. The drive circuit serves for driving the MOSFET T1. In the exemplary embodiment, the low-pass filter TP is an LC element, that is to say, as a series circuit including an inductance L and a capacitance C, the capacitance C being connected in parallel with the output terminals AK1, AK2.

Connected in parallel with the low-pass filter TP is a freewheeling circuit FS that, according to the invention, has a second voltage-controlled switch T2 having a control terminal G and a load path formed between a first load path terminal S and a second load path terminal D. The second switch T2 is configured as a reverse-blocking n-channel FET, i.e., it is in the off state both with application of a positive voltage between the drain terminal D and the source terminal S and with application of a positive voltage between the source electrode S and the drain electrode D, that is to say, in the reverse direction. To that end, a body zone within the transistor T2 is disposed in a floating fashion or is connected to a source zone through a non-reactive resistor, which will be explained subsequently with reference to FIG. 5. The floating configuration of the body zone can be seen in FIG. 2 from the non-connected terminal B of the body zone, which is also referred to as a substrate terminal.

The drain-source path D-S of the transistor T2 is connected in parallel with the LC element. A diode D1 as rectifier element is connected between the source terminal S and the gate terminal G of the second transistor T2.

If, in the voltage converter according to the invention, an input voltage V1 is present at the input terminal pair EK1, EK2 and, initially, the first transistor T1 is in the on state and the second transistor T2 is in the off state, then, approximately the entire input voltage V1 is present across the drain-source path D-S of the second transistor T2. With first transistor T1 in the on state, a current flows through the coil L to the capacitance C and through the load $R_L$. The current through the coil L rises continuously in such a case. If the first transistor T1 turns off, then the current through the coil L maintains its direction but the voltage present across the coil L changes its sign. As a result, the potential at the node K1 that is common to the coil L and the first and second transistors T1, T2 falls to a value below the value of the reference-ground potential GND. The diode D1 connected between the source terminal S and the gate terminal G of the second transistor T2 turns on and charges the gate G of the second transistor T2 to a positive potential relative to the potential value of the node K1. Thus, the second transistor T2 turns on and closes the electric circuit between the capacitor, or the load $R_L$ and the coil L.

The diode D1 makes it possible to use a reverse-blocking FET T2 as second switch in which no freewheeling diode is connected directly between the source terminal S and the drain terminal D. The freewheeling diode can be dispensed with because, immediately after the first transistor T1 has turned off, when the potential at the node K1 decreases, the second transistor T2 is turned on in a manner driven by the diode D1.

Figure 4:
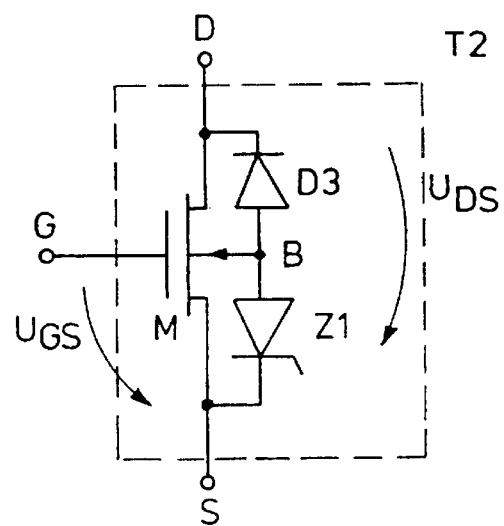
FIG. 4 is a schematic circuit diagram of an alternative embodiment of a MOSFET serving as a second switch in the voltage converter of FIGS. 2 and 3.

FIG. 4 shows an equivalent circuit diagram of a reverse-blocking MOSFET T2 as is used as second switch in the voltage converter according to the invention. In the MOSFET, in which the source region S and the body region B are not short-circuited, a reverse-biased zener diode Z1 is formed between the source terminal S and the body region B of a FET M. Furthermore, a forward-biased diode D3 is formed between the body region B and the drain terminal D. If, in such a component, no control voltage $U_{GS}$ is present between the gate terminal and the source terminal S, then the FET M is in the off state. With application of a positive voltage between the drain terminal D and the source terminal S, the diode D3 is reverse-biased, so that, moreover, no current can flow in a manner bypassing the FET M. If a negative drain-source voltage $U_{DS}$ is present, the diode D3 is forward-biased and the zener diode Z1 is reverse-biased. When the breakdown voltage of the zener diode Z1 is reached, a current flows through the zener diode Z1 and the diode D3 in a manner bypassing the FET M. The breakdown voltage of the zener diode Z1 is a few volts and is significantly greater than the threshold voltage of freewheeling diodes that, in conventional MOSFETs, are formed in the forward direction between the source terminal and the drain terminal. Thus, the second transistor T2 also blocks in the source-drain direction.

Figure 5:
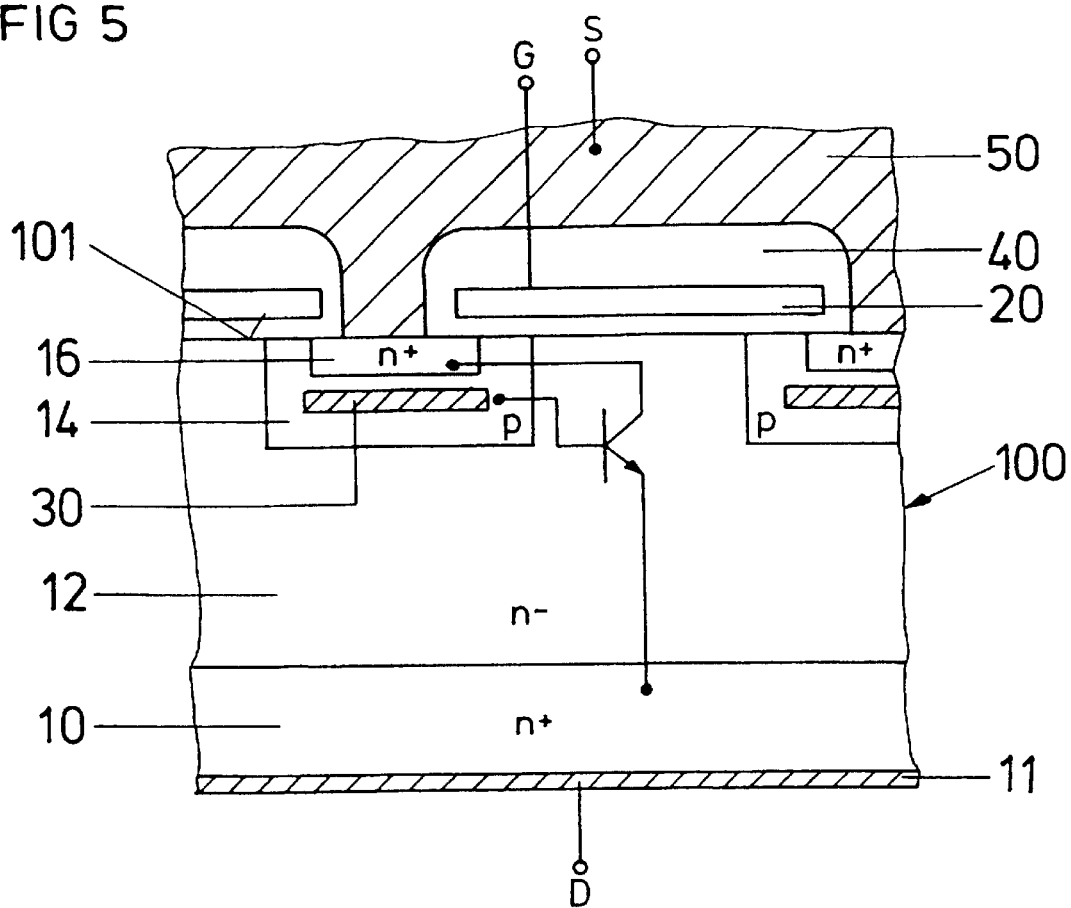
FIG. 5 is a fragmentary, sectional view through a reverse-blocking MOSFET according to the invention.

FIG. 5 shows an exemplary embodiment for the realization of such a reverse-blocking MOSFET.

The MOSFET, preferably, has a multiplicity of identically constructed transistor cells that are connected together and each of which fulfills the function of a transistor. In such a case, the current-carrying strength of the transistor increases with the number of transistor cells present, only one of which is illustrated in its entirety in FIG. 5. The cell-like construction of a MOS transistor is sufficiently known, moreover, and is described, for example, in Stengl/Tihanyi "Leistungs-MOSFET-Praxis" [Power MOSFETs in practice], Pflaum Verlag, Munich, 1992, page 34.

The MOSFET illustrated in FIG. 5 is configured as an n-conducting MOSFET. The active regions of the MOS transistor are realized in a semiconductor body 100 having a heavily n-doped zone, for example, a substrate 10, to which a more weakly n-doped layer 12 is applied, for example, by epitaxy. A p-doped well 14, which forms the body zone of the MOS transistor, is introduced into the n-doped layer 12 proceeding from a front side 101 of the semiconductor body 100. A heavily n-doped zone 16 is formed in the p-doped body zone 14.

The heavily n-doped zone 16 forms the source zone of the MOS transistor and is contact-connected by a source electrode S, for example, made of metal or polysilicon. The heavily doped substrate 10 and the more weakly doped zone 12 form the drain zone of the MOS transistor, which is contact-connected at a rear side of the semiconductor body by an electrically conductive layer 11, for example, a metallization layer. The more weakly n-doped zone 12 serves as drift path of the transistor.

To form a conductive channel in the body zone 14 disposed between the source zone 16 and the drift zone 12, a gate electrode 20 is provided that is insulated from the source electrode S and the semiconductor body 100 by an insulation layer.

In the MOS transistor illustrated, the body zone 14 of the MOS transistor is disposed in a floating fashion, i.e., the zone 14 is connected to no defined potential or to no externally connected terminal of the transistor. In particular, the body zone 14 is not short-circuited to the source zone 16. Between the source zone 16 and the body zone 14, in the same way as between the drift zone 12 and the body zone 14, there is a pn junction present, which forms the zener diode Z1.

A parasitic bipolar transistor is formed in the MOS transistor by virtue of the sequence of the n-doped drain zone 10, 12, the p-doped body zone 14, and the n-doped source zone 16, the base of the bipolar transistor being formed by the body zone 14. The bipolar transistor is an npn transistor in the case of the n-conducting MOS transistor illustrated and a pnp transistor in the case of a p-conducting MOS transistor.

The circuit symbol of such an npn bipolar transistor is depicted for illustration purposes in FIG. 5. Such a bipolar transistor influences the dielectric strength of the component when a voltage is applied between the drain terminal D and the source terminal S.

When such a voltage is applied, in an n-conducting transistor, p-type charge carriers, i.e., holes, pass into the body zone 14, where they generate new charge carriers on account of the electric field prevailing there, which finally leads to the breakdown of the transistor as the voltage rises. To reduce the effect of these holes that have passed into the body zone 14, a recombination zone 30 is advantageously provided in the body zone 14. The recombination zone 30 is, preferably, composed of a metal, e.g., aluminum, platinum, titanium or tungsten, or of a silicide and is constructed in a plate-type manner, in a parallelepipedal manner, in a strip-type manner or the like. The recombination zone 30 promotes the recombination of holes that have passed into the body zone 14 with electrons at the surface of the recombination zone 30. The drain-source voltage at which a voltage breakdown of the MOS transistor occurs is, thus, increased compared with an embodiment in which no recombination zone 30 is provided.

In conventional MOS transistors, the body zone and the source zone are short-circuited to prevent the accumulation of holes in the body zone. The breakdown voltage of a MOS transistor in accordance with FIG. 5 without such a short circuit, that is to say, with a body zone disposed in a floating fashion, may correspond, by virtue of the provision of the recombination zone 30, to the breakdown voltage of a MOS transistor with a short circuit between body zone and source zone.

In an alternative of the half-bridge circuit according to the invention, the body zone 14 of the MOS transistor that forms the second switch is connected to the source zones 16 through a very large non-reactive resistor—in particular, a resistor in the kilo-ohm to mega-ohm range. With reference to FIG. 5, such a non-reactive resistor can be produced between the source zone 16 and the body zone by "disturbing" the pn junction between the source zone 16 and the body zone 14. Such a disturbance of the crystal lattice can be produced, for example, by implantation of atoms, for example, argon atoms, in the region of the pn junction between source 16 and body 14 or by "bombardment" of the pn junction with helium.

Figure 6:
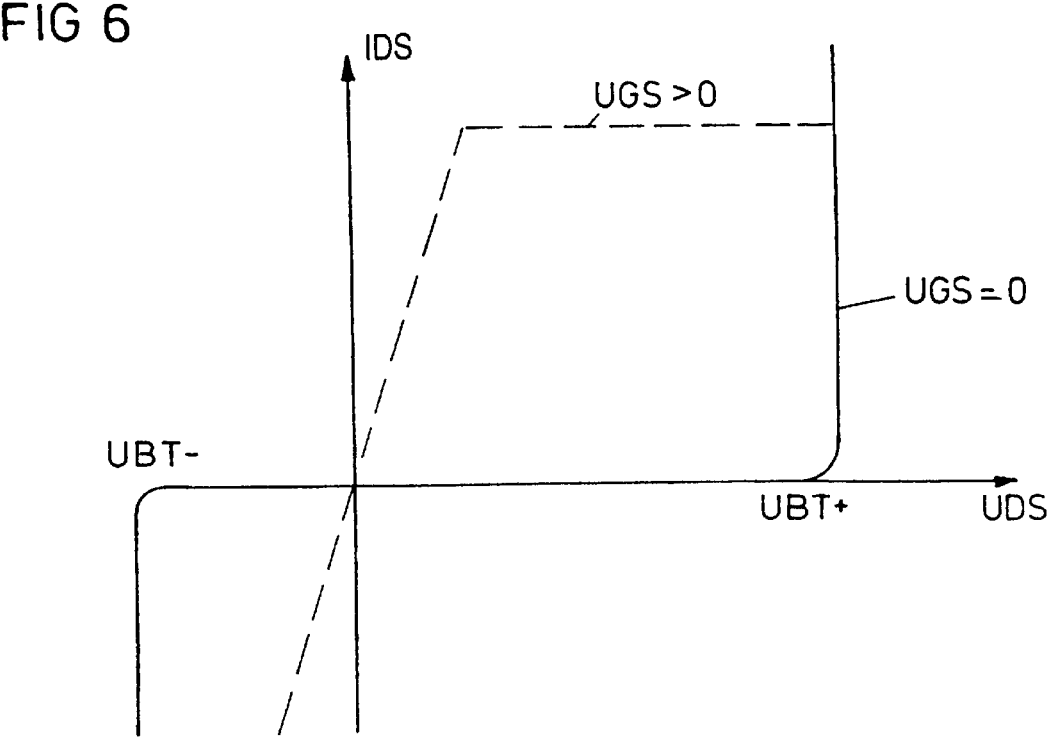
FIG. 6 is a graph illustrating a characteristic curve of a MOSFET according to FIGS. 4 and 5.

FIG. 6 shows the characteristic curve of an n-conducting MOS transistor in accordance with FIGS. 4 and 5. The illustration shows the drain-source current IDS against the drain-source voltage UDS at a gate-source voltage UGS>0 V and a gate-source voltage UGS=0 V.

If the characteristic curve is considered, it becomes clear that in the off-state situation, that is to say, when no gate-source voltage UGS is present, that is to say, UGS=0 V, the MOS transistor is in the off state with application of a positive drain-source voltage UDS up to a voltage UBT+, the breakdown voltage of the diode DS, and enters into breakdown at higher voltage. The transistor is also in the off state in the case of negative drain-source voltages UDS up to a voltage UBT−, the breakdown voltage of the zener diode Z1, if no gate-source voltage is present. Thus, the transistor blocks in the forward direction, i.e., in the case of positive drain-source voltages UDS, up to a voltage UBT+ and in the reverse direction, i.e., in the case of negative drain-source voltages UDS, up to a voltage UBT−.

The voltage UBT− up to which the MOS transistor blocks in the reverse direction is usually lower than the blocking voltage UBT+ in the forward direction. Such a characteristic results from the usually non-symmetrical construction of power transistors, as is also illustrated in FIG. 2. In the case of such a transistor, a more weakly doped zone 12 is formed between the heavily doped zone 10 of the drain zone and the body zone 14, which zone 12 acts as drift path and, in the case of an n-channel MOSFET, with application of a positive drain-source voltage UDS between the drain terminal D and the source terminal S, accepts part of the drain-source voltage UDS. In such a case, the blocking voltage in the forward direction is crucially dependent on the doping of the layer 12 and the thickness of the layer 12 between the heavily doped zone 10 and the body zone 14. In the exemplary embodiment in accordance with FIG. 5, no such more weakly doped zone is formed between the source zone 16 and the body zone 14, which has the result that, in the case of an n-conducting MOSFET, with application of a negative drain-source voltage or in the case of a positive voltage between the source terminal S and the drain terminal D, the voltage that can be applied until breakdown is reached is lower.

If a component in accordance with FIG. 4 is used as second transistor T2 in the voltage converter according to the invention, then the MOSFET M is turned on through the diode D1 so rapidly that the voltage in the source-drain direction of the transistor T2 does not reach the value of the breakdown voltage of the zener diode Z1. The diode D3 is not turned on and, thus, stores no charge that might lead to switching losses when the MOSFET M is turned off.

Although a charge is stored in the diode D1 when the second switch T2 is driven, because the diode D1 merely serves for charging the gate G of the second transistor T2, it can be configured with a correspondingly small area so that the stored charge is very small and can, thus, be dissipated vary rapidly when the second transistor T2 is intended to turn off. This means that only very small switching losses occur.

The previous consideration assumed that the input voltage V1 is a positive voltage between the first input terminal EK1 and the second input terminal EK2. It goes without saying that the voltage converter according to the invention also functions for negative input voltages, in which case the polarity of the diode D1 must then be interchanged. It goes without saying that the MOSFETs T1, T2 configured as n-channel field-effect transistors can also be configured as p-channel field-effect transistors.

To turn the second transistor T2 off, its gate terminal G1 is connected to a second output terminal AK4 of the drive circuit IC, which discharges the gate G of the second transistor T2 to reference-ground potential GND, for example, in order to turn the second transistor off.

The drive circuit IC is configured to ensure that only one of the two transistors T1, T2 respectively is in the on state, and, thus, to prevent the current from flowing away to reference-ground potential GND directly through the first transistor T1 and the second transistor T2 with short-circuiting of the low-pass filter TP and the load $R_L$. In the steady-state condition, the output voltage V2 is approximately constant with load $R_L$ remaining the same. Consequently, the low-pass filter TP converts the input voltage V1, which is applied to the low-pass filter TP in a clocked manner, into a lower output voltage V2. In such a case, the value of the output voltage V2 is adjustable by way of the switching frequency of the first transistor, that is to say, by way of the frequency with which the first transistor is switched on and off, and by way of the switching duration, that is to say, the duration for which the first transistor T1 respectively remains closed after the switch-on.

To be able to readjust the output voltage V2 by way of the switching frequency and the switching duration during changes in the load $R_L$, the first output terminal AK1 is connected to an input terminal EK3 of the drive circuit IC, the drive circuit IC taking account of the value of the output voltage V2 in the generation of the switching frequency and/or the switching duration.

Figure 3:
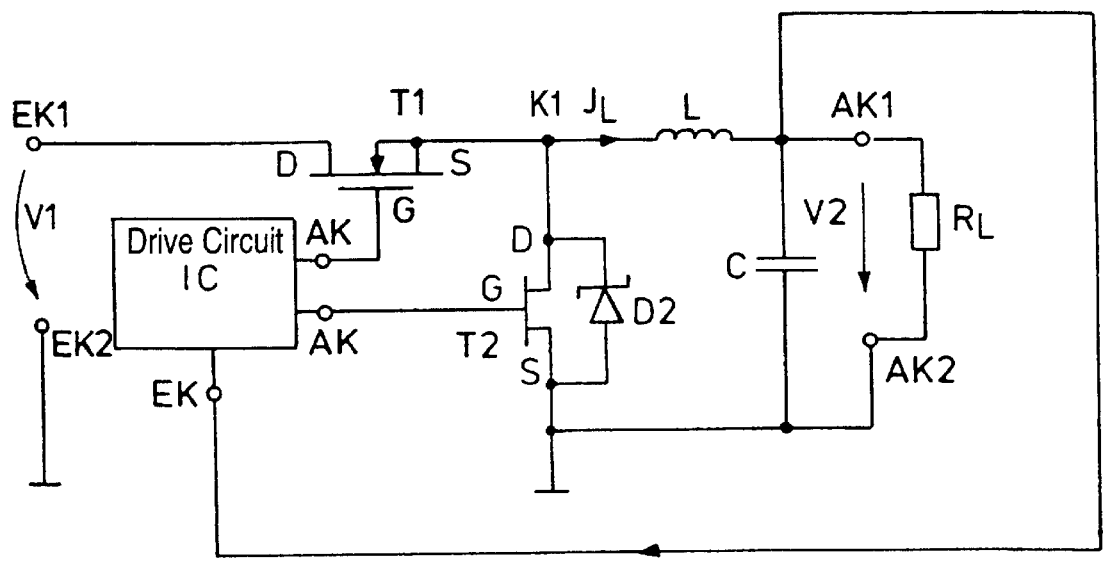
FIG. 3 is a schematic circuit diagram of a second embodiment of the voltage converter according to the invention.

FIG. 3 shows a further embodiment of a voltage converter according to the invention, in which a Schottky diode D2 is connected in parallel with the load path of a second switch T2, which is configured as a reverse-blocking FET T2 in the exemplary embodiment, the drain-source path D-S of the FET T2 being connected in parallel with the LC element. The Schottky diode D2 is connected in parallel with the drain-source path of the transistor T2.

If, in the voltage converter according to the invention, an input voltage V1 is present at the input terminal pair EK1, EK2 and, initially, the first transistor T1 is in the on state and the second transistor T2 is in the off state, then approximately the entire input voltage V1 is present across the drain-source path D-S of the second transistor T2. The Schottky diode D2, which is reverse-biased in such a case, is in the off state.

With first transistor T1 in the on state, a current flows through the coil L to the capacitance C and through the load $R_L$. In such a case, the current through the coil L rises continuously. If the first transistor T1 subsequently turns off, the current through the coil L maintains its direction, but the voltage present across the coil L changes its sign. As a result, the potential at the node K1 common to the coil L and the first and second transistors T1, T2 falls to a value below the value of the reference-ground potential GND. The Schottky diode D2 begins to turn on and accepts the current $I_L$ through the coil. After the first transistor T1 has turned off, the second transistor T2 also begins to turn on in a manner driven by the drive circuit IC. The second transistor T2 and the Schottky diode D2 are, preferably, coordinated with one another such that the voltage dropped across the load path D-S of the second transistor T2 is lower than the forward voltage of the Schottky diode D2 when the second transistor T2 is fully in the on state. This is because the Schottky diode D2 then turns off immediately after the second transistor T2 has turned on, in which case, no charge that might lead to switching losses after the second transistor T2 has turned off—in a manner driven by the drive circuit IC—remains stored in the Schottky diode D2.

The second transistor T2 is a reverse-blocking FET whose equivalent circuit diagram is illustrated by way of example in FIG. 4 and explained above.

If a component in accordance with FIG. 4 or in accordance with FIG. 5 is used in the voltage converter according to the invention, then the breakdown voltage of the zener diode Z1 is not reached due to the Schottky diode D2 connected in parallel with the load path so that charge that might lead to switching losses when the MOSFET M is turned off is not stored in the diode D3 either.

In the exemplary embodiment in accordance with FIG. 3, the two transistors T1, T2 are connected to a common drive circuit IC for driving. The drive circuit is configured to ensure that only one of the two transistors T1, T2 respectively is in the on state, and, thus, to prevent the current from flowing away to reference-ground potential GND directly through the first transistor T1 and the second transistor T2 with short-circuiting of the low-pass filter TP and the load $R_L$. The drive circuit IC turns the first transistor T1 on and turns the second transistor T2 off if the coil L is intended to take up current, and turns the second transistor T2 on and turns the first transistor T1 off if the uptake of current by the coil L is to be concluded.

The drive circuit IC is, preferably, configured as an integrated circuit in which the diode D1, which serves for driving the second transistor T2, can also be integrated.

I claim:

1. A voltage converter, comprising:
   a pair of input terminals for receiving an input voltage;
   a series circuit connected between said pair of input terminals and having:
      a first switch; and
      a low-pass filter having output terminals to be connected to a load;
   a freewheeling circuit connected in parallel with said low-pass filter, said freewheeling circuit having a second switch, said second switch having:
      a first load path terminal;
      a second load path terminal;

a load path formed between said second load path terminal and said first load path terminal; and a control terminal; and said second switch being a MOS transistor having one of:
   a floating body zone; and
   a source zone, a non-reactive resistor, and a body zone connected to said source zone through said non-reactive resistor.

2. The voltage converter according to claim 1, including a rectifier element connected between said first load path terminal and said control terminal of said second switch.

3. The voltage converter according to claim 1, wherein said floating body zone is a body zone not connected to a defined potential.

4. The voltage converter according to claim 1, including a Schottky diode connected in parallel with said load path of said second switch.

5. The voltage converter according to claim 1, wherein:
   said low-pass filter has a series circuit with:
      a coil; and
      a capacitor; and
   said capacitor is connected in parallel with said output terminals.

6. The voltage converter according to claim 1, wherein said first switch is a transistor.

7. The voltage converter according to claim 1, wherein said first switch is a field-effect transistor.

8. The voltage converter according to claim 1, including a drive circuit having an output terminal connected to said first switch for driving said first switch.

9. The voltage converter according to claim 8, wherein said drive circuit drives said first switch dependent upon one of:
   an output voltage tapped off at said output terminals; and
   a current through said coil of said low-pass filter.

10. The voltage converter according to claim 1, including a drive circuit connected to said control terminal of said second switch and driving said second switch dependent upon a switching state of said first switch.

11. The voltage converter according to claim 1, including a drive circuit for both of said first and second switches.

12. The voltage converter according to claim 11, wherein said drive circuit prevents said first switch and said second switch from both being in an on state simultaneously.

13. The voltage converter according to claim 1, including a drive circuit connected to said first switch and said second switch.

14. The voltage converter according to claim 13, wherein said drive circuit prevents said first switch and said second switch from both being in an on state simultaneously.

15. The voltage converter according to claim 1, wherein said second switch is a MOSFET having:
   a body zone; and
   a recombination zone formed in said body zone.

* * * * *